UNITED STATES PATENT OFFICE.

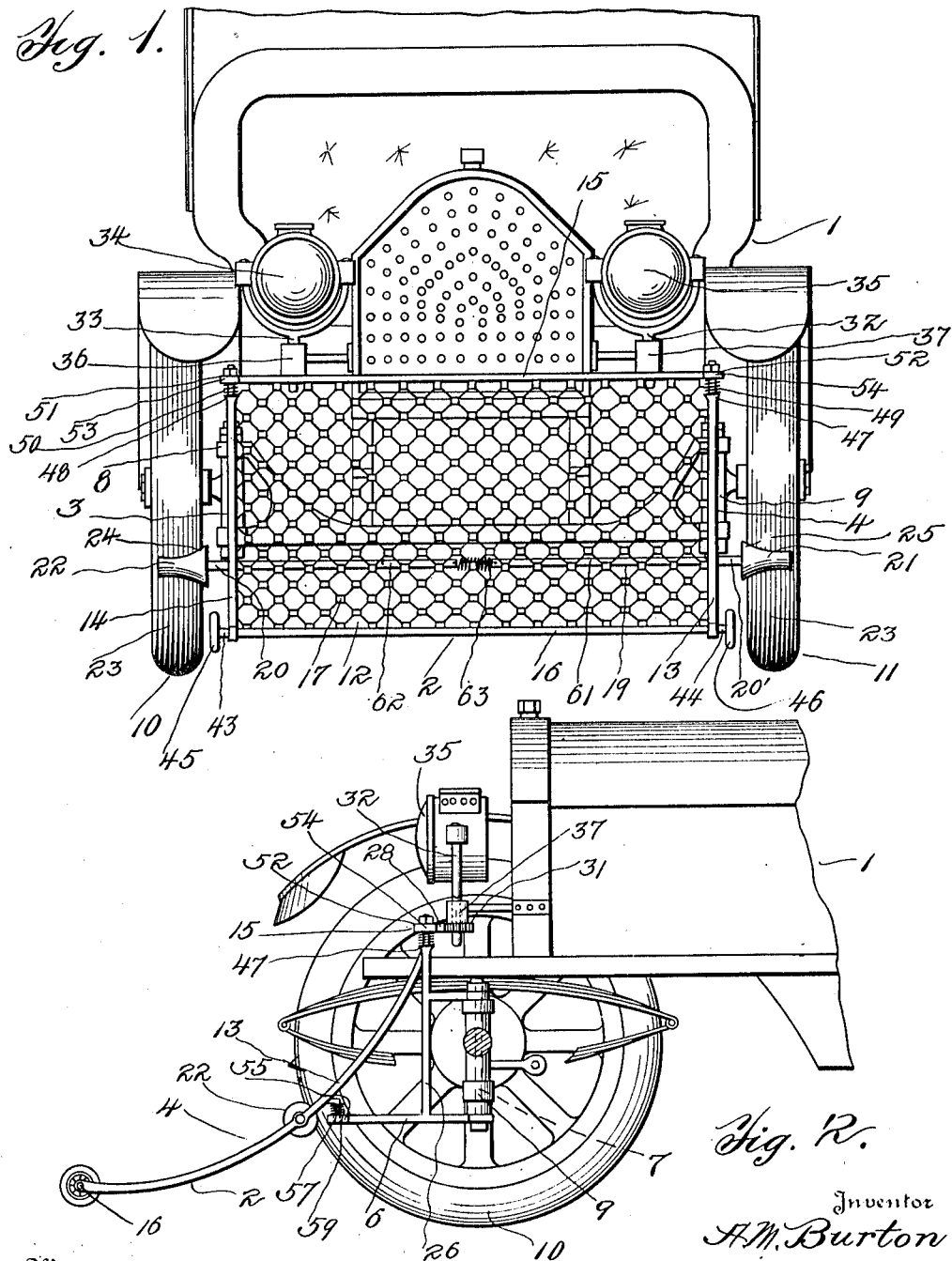

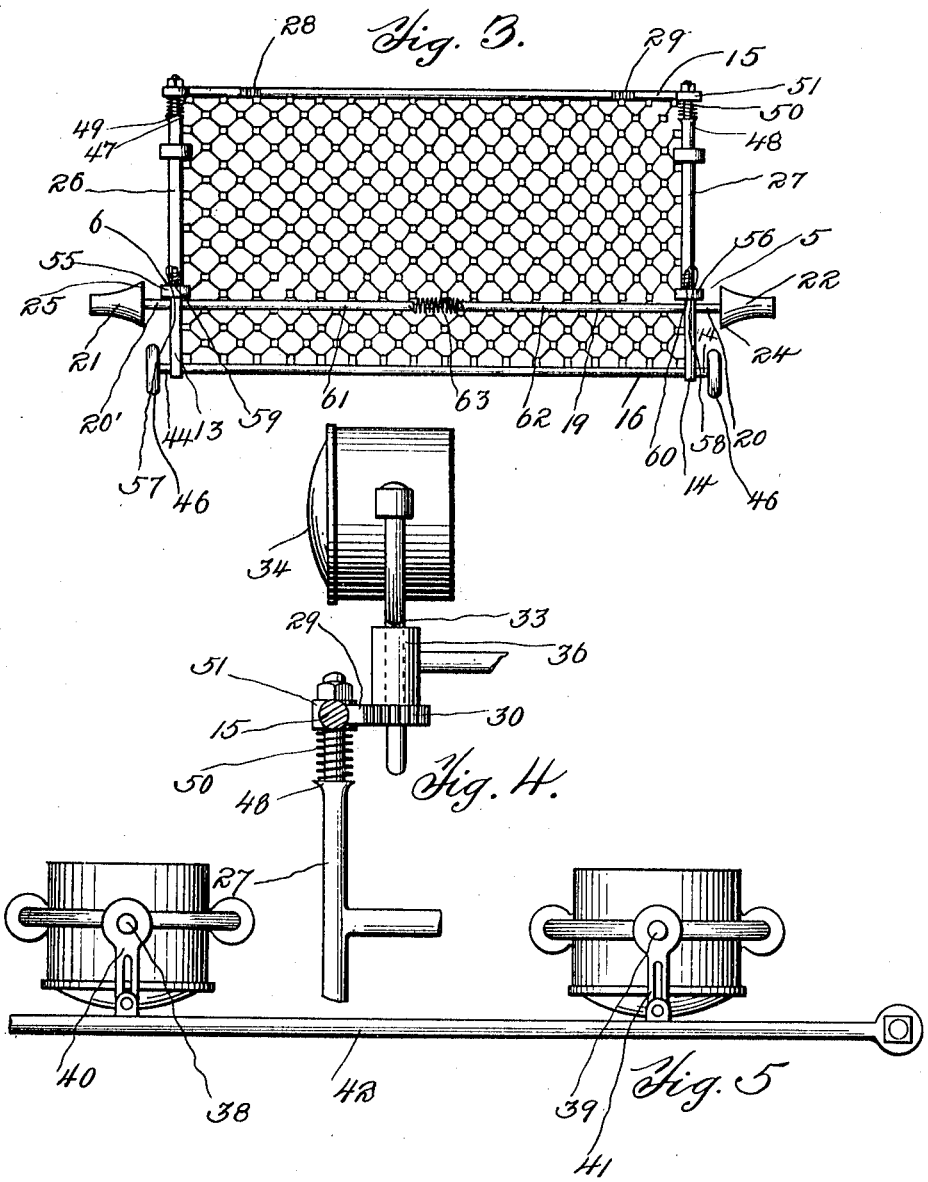

ALEXANDER McCORD BURTON, OF PITTSBURGH, PENNSYLVANIA.

FENDER.

1,316,939.  Specification of Letters Patent.  Patented Sept. 23, 1919.

Application filed May 1, 1916, Serial No. 94,783. Renewed August 15, 1919. Serial No. 317,810.

*To all whom it may concern:*

Be it known that I, ALEXANDER M. BURTON, a citizen of the United States, residing at Pittsburgh, in the county of Allegheny and State of Pennsylvania, have invented certain new and useful Improvements in Fenders, of which the following is a specification.

This invention relates to fenders and has for its object to provide a fender mounted upon the steering knuckles of a vehicle.

Another object of the invention is to provide a fender pivotally mounted upon the steering knuckles of a vehicle and provided with wheel engaging devices for supporting the lower portion of the fender.

Still another object of the invention is to provide a fender having wheel tire engaging members for supporting and guiding the fender in the direction of the movement of the vehicle.

A still further object of the invention is to provide a fender operated dirigible headlight for vehicles.

With the above and other objects in view as will hereinafter more fully appear I have invented the device illustrated in the accompanying drawings in which—

Figure 1 is a front elevational view of an automobile embracing my invention,

Fig. 2 is a side elevational view thereof partly broken away,

Fig. 3 is a detail rear elevational view of the fender removed from the vehicle, Fig. 4 is a detail elevational view of a headlight, and Fig. 5 is a detail fragmental view showing a modified form of headlight operating means.

Like reference characters indicate like parts throughout the following specification and in the several views in the drawings in which 1 indicates an automobile having a fender 2, each of the side frame members 3 and 4 of which are provided with lever arms 5 and 6 which are fixed to the upper and lower ends of the pivot pins 7 of the knuckles 8 and 9 in order that said side frame members will be rotatably moved with the rotatable movement of the wheels 10 and 11. Mounted on the frame members 3 and 4 is a fender member 12 having a frame formed of arcuate side members 13 and 14 and upper and lower transverse bars 15 and 16 fixed to the opposite ends thereof. A suitable fender fabric 17 is mounted upon the bars 15 and 16. The fabric 17 has sufficient "give" or resilience to it to form a basket to hold any object that may drop or be knocked thereagainst.

A transverse rod 19 is mounted upon the side members 13 and 14 and projects beyond each side thereof to form spindles 20 and 20' upon which the spools 21 and 22 are mounted. These spools are shaped to the contour of the tires 23 whereby said tires will operate against the flanges 24 and 25 of said spools to guide the outer portion of the fender to readily follow the movement of the wheels. By means of the spools and knuckle mountings of the fender it has a movement that exactly conforms to the movement or direction of travel of the automobile and is therefore just as effective in making curves and rounding corners as in traveling straight ahead which is not the case with fixed fenders; and it is a well known fact that most accidental collisions with pedestrians occur in rounding corners or in making curves. The arms 6 connect with the members 13 and 14 at their juncture with the rod 19, and said arms 5 and 6 are connected by uprights 26 and 27 which extend vertically above the arms 5 and 6 and form supports for the rod 15.

The rod 15 is provided on its rear side with racks 28 and 29 which engage the pinions 30 and 31 on the lower part of the pivotally mounted supports 32 and 33 for the headlights 34 and 35 which are rotatably mounted in the brackets 36 and 37 whereby the lamp supports together with their lamps 34 and 35 are caused to move with the direction of travel of the automobile, thus at all times assuring a lighted path in which the vehicle travels whether going straight ahead or taking curves.

The bar 16 projects beyond the members 13 and 14 to form spindles 43 and 44 upon which the wheels 45 and 46 are mounted. In order that the fender may be held slightly out of contact with the road surface, flanges 47 and 48 are provided on each upright 26 and 27 upon which coil springs 49 and 50 are seated and upon which seat the ends 51 and 52 of the bar 15, said ends being provided with eyes 53 and 54 through which the uppermost ends of the members 26 and 27 project. The arms 5 and 6 are provided with eyes 55 and 56 through which brackets 57 and 58 are movable. Springs 59 and 60 are mounted around said brackets and seat upon said arms 5 and 6 over the eyes thereof. The rod 19 may be formed in two parts 61 and 62 connected centrally by a strong coil spring 63 whereby under a heavy shock, or pressure such as the falling of a body thereon, it will yield to the pressure and avoid injury to said body.

A modification of the operation of the headlights is shown in Fig. 5 in which the rods 38 and 39 of the lamp supports are provided with fixed levers 40 and 41 which have pivotal and loose movement connection with the rod 42 of the fender frame whereby the horizontal movement of said rod 42 will cause the rods 38 and 39 to rotate the headlights in the desired directions.

Having now described my invention that which I claim to be new and desire to procure by Letters Patent is:—

1. In combination with a vehicle having pivoted axle knuckles, brackets fixed on said knuckles and a fender movably mounted upon said brackets, said brackets having vertical and horizontal arms for engagement with said fender, and springs between each of said arms and said fender for holding the fender suspended.

2. In a vehicle, an inclined scoop fender having a frame mounted upon the knuckle joints of the vehicle, whereby the fender will be steered in the direction of movement of the vehicle, wheel engaging spools on said fender, to assist in the steering thereof.

3. In a vehicle, an inclined scoop fender having a frame mounted upon the knuckle joints of the vehicle, whereby the fender will be steered in the direction of movement of the vehicle, wheel engaging rotatable spools on said fender to assist in the steering thereof, said spools being shaped to the contour of the tires of the wheels.

4. In combination with a vehicle having pivoted axle knuckles, brackets fixed on said knuckles and a fender movably mounted upon said brackets, said brackets having vertical and horizontal arms for engagement with said fender, springs between each of said arms and said fender for holding the fender suspended, and said fender having centrally disposed brackets adapted to seat in openings in said horizontal arms.

5. In a vehicle, a fender having a frame mounted upon the knuckle joints of the vehicle whereby the fender will be steered in the direction of movement of the vehicle, wheel engaging members on said fender to assist in the steering thereof, said members being shaped to the contour of the tires of the wheels in combination with dirigible headlights operable by said fender.

6. In a vehicle, a fender having a frame mounted upon the knuckle joints of the vehicle whereby the fender will be steered in the direction of movement of the vehicle, wheel engaging members on said fender to assist in the steering thereof, said members being shaped to the contour of the tires of the wheels in combination with dirigible headlights operable by said fender, and rotatable posts for said lamps.

7. In a vehicle, a fender having a frame mounted upon the knuckle joints of the vehicle whereby the fender will be steered in the direction of movement of the vehicle, wheel engaging members on said fender to assist in the steering thereof, said members being shaped to the contour of the tires of the wheels in combination with dirigible headlights operable by said fender, rotatable posts for said headlights and pinions thereon operated by said fender.

8. In a vehicle, a fender having a frame mounted upon the knuckle joints of the vehicle whereby the fender will be steered in the direction of movement of the vehicle, wheel engaging members on said fender to assist in the steering thereof, said members being shaped to the contour of the tires of the wheels in combination with dirigible headlights operable by said fender, rotatable posts for said headlights and pinions thereon operated by said fender, and racks on said fender having engagement with said pinions.

9. In a vehicle, a fender having a frame mounted upon the knuckle joints of the vehicle whereby the fender will be steered in the direction of movement of the vehicle, wheel engaging members on said fender to assist in the steering thereof, said members being shaped to the contour of the tires of the wheels in combination with dirigible headlights operable by said fender, rotatable posts for said headlights and pinions thereon operated by said fender, whereby the movement of the fender and lamps will be conjunctive.

10. In combination with a vehicle having pivoted axle knuckles, brackets fixed on said knuckles and a fender movably mounted upon said brackets, said brackets having vertical and horizontal arms for engagement with said fender, a rod connecting said vertical arms and means on said rod for rotating pivotally mounted lamps, and said rod supporting the upper end of said fender.

11. In combination with a vehicle having pivoted axle knuckles, brackets fixed on said knuckles and a fender movably mounted upon said brackets, said brackets having vertical and horizontal arms for engagement with said fender, and arcuate arms for the sides of said fender and tire engaging spools mounted in said arcuate arms.

12. In combination with a vehicle having pivoted axle knuckles, brackets fixed on said knuckles and a fender movably mounted upon said brackets, said brackets having vertical and horizontal arms for engagement with said fender, arcuate arms for the sides of said fender and tire engaging spools mounted in said arcuate arms, and said spools being formed to the contour of said tires.

13. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamps, and resilient means for holding said rod in operative connection with said lamps.

14. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamps, and a fender supported by said rod.

15. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamps, a fender supported by said rod, means on said fender whereby said fender may be guided.

16. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamps, a fender supported by said rod, means on said fender whereby said fender may be guided, said means consisting of rotatable spools.

17. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamp, a fender supported by said rod, means on said fender whereby said fender may be guided, said means consisting of rotatable spools, adapted to be operated through the steering of the wheels of said vehicle.

18. In a vehicle having pivoted spindle knuckles, brackets fixed to said knuckles, vertical arms on said brackets, a transverse rod connecting the upper ends of said arms, in combination with pivotally mounted lamps and means whereby said rod will rotate the lamp, a fender supported by said rod, means on said fender whereby said fender may be guided, said means consisting of rotatable spools, adapted to be operated through the steering of the wheels of said vehicle, and said lamps having pinions and said bar having a rack for engagement with said pinions to cause said rotation of said lamps.

In testimony whereof I affix my signature in the presence of two witnesses.

ALEXANDER McCORD BURTON.

Witnesses:
   JNO. A. BEIRCHNER,
   ARTHUR EINERT.

Copies of this patent may be obtained for five cents each, by addressing the "Commissioner of Patents, Washington, D. C."